United States Patent [19]

Yada et al.

[11] Patent Number: 5,443,299
[45] Date of Patent: * Aug. 22, 1995

[54] WINDSHIELD MOLDING FOR VEHICLES AND THE PRODUCTION METHOD THEROF

[75] Inventors: Yukihiko Yada; Tosikazu Ito, both of Nagoya, Japan

[73] Assignee: Tokai Kogyo Kabushiki Kaisha, Ohbu, Japan

[ * ] Notice: The portion of the term of this patent subsequent to Apr. 27, 2011 has been disclaimed.

[21] Appl. No.: 257,733

[22] Filed: Jun. 9, 1994

Related U.S. Application Data

[62] Division of Ser. No. 953,968, Sep. 30, 1992, Pat. No. 5,350,211.

[30] Foreign Application Priority Data

| Sep. 30, 1991 | [JP] | Japan | 3-278584 |
| Sep. 30, 1991 | [JP] | Japan | 3-278585 |
| Aug. 18, 1992 | [JP] | Japan | 4-063341 |

[51] Int. Cl.[6] ............................................. B60J 10/02
[52] U.S. Cl. ........................................ 296/93; 296/201; 52/208
[58] Field of Search .................... 296/93, 201; 52/208

[56] References Cited

U.S. PATENT DOCUMENTS

| 4,757,660 | 7/1988 | Miyakawa et al. | |
| 4,840,001 | 6/1989 | Kimisawa | 296/93 X |
| 4,884,300 | 12/1989 | Yoda et al. | 296/93 X |
| 5,032,444 | 7/1991 | Desir, Sr. | 296/93 X |
| 5,149,168 | 9/1992 | Yada et al. | 296/93 X |
| 5,171,051 | 12/1992 | Yada | 296/93 |
| 5,176,420 | 1/1993 | Kato | 296/93 |

FOREIGN PATENT DOCUMENTS

| 55-42617 | 3/1980 | Japan . |
| 58-73014 | 5/1983 | Japan . |
| 59-8523 | 1/1984 | Japan . |
| 60-248426 | 12/1985 | Japan . |
| 63-286321 | 11/1988 | Japan . |
| 63-291721 | 11/1988 | Japan . |
| 1-145223 | 6/1989 | Japan . |
| 1-195032 | 8/1989 | Japan . |
| 1-144109 | 10/1989 | Japan . |
| 3-128721 | 5/1991 | Japan . |

*Primary Examiner*—Joseph D. Pape
*Attorney, Agent, or Firm*—Oblon, Spivak, McClelland, Maier & Neustadt

[57] ABSTRACT

A windshield molding for vehicles and the production method thereof consisting of common sections which are molded using a more rigid material to provide the rigidity required to maintain the position and shape of the molding during and after installation, and of bending sections being installed in bent shapes which are molded by use of a more flexible material to provide the required flexibility for bending molding easily, thus providing satisfactory bending ease and transportation ease while maintaining sufficient rigidity as required for stable installation.

1 Claim, 13 Drawing Sheets

WINDSHIELD MOLDING FOR VEHICLES AND THE PRODUCTION METHOD THEROF

This is a division of application Ser. No. 07/953,968, filed on Sep. 30, 1992, now U.S. Pat. No. 5,350,211.

BACKGROUND OF THE INVENTION

1. Field of the Invention

This invention relates to a molding for vehicles for installation to the periphery of windshield glass, and to a bumper surface, and the production methods thereof.

2. Description of the Prior Art

Various types of moldings can be installed on the bodies of vehicles. For example, moldings provided with both sealing and decorative functions are installed to the periphery of windshield glass mounted to a window opening, while decorative bumper moldings are installed to the front and side surfaces of bumpers. Said moldings are usually extrusion molded in a long belt shape using elastomers such as rubber and synthetic resins, and usually consist of a support leg which adheres and fastens to the vehicle body side and a decorative portion which is exposed toward the outside. For these molded resin moldings, it is advisable to use materials of high rigidity from the viewpoint of ease of mounting to the vehicle body panel, and for their shape retention quality.

Meanwhile, the provision of a groove to retain rainwater flowing down over the surface of said windshield glass and to drain rainwater thus remained has been proposed for some Time. Such propositions are made in Japanese Utility Model Gazette No. 54416/1982 (Japanese Utility Model Laid-Open Publication No. 42617/1980),Japanese Patent Laid-Open Publication No. 291721/1988 (U.S. Pat. No. 4757660), Japanese Patent Laid-Open Publication No. 195032/1989 (U.S. Pat. No. 4,865796), Japanese Patent Laid-Open Publication No. 223018/1989 and Japanese Utility Model Laid-Open Publication No. 144109/1989 (U.S. Pat. No. 4,984,839) and Japanese Patent Laid-Open Publication No. 128721/1991. For such vehicle windshield moldings provided with rainwater remaining grooves, it is necessary to use materials of high rigidity for those sections which are raised from the surface of the windshield glass.

Nevertheless, when the whole body of such molding is molded by use of a single high rigidity material, a problem occurs to the effect that it becomes difficult to bend the corner section during mounting work, thus lowering productivity. Various propositions for satisfactorily bending the corner section without difficulty have been made, such as in Japanese Utility Model Laid-Open Publication No. 73014/1983, Japanese Patent Laid-Open Publication No. 8523/1984 and Japanese Patent Laid-Open Publication No. 248426/1985. Nevertheless, with these propositions, the increased number of processes for manufacturing molding and for mounting to vehicle bodies cause problems in productivity and, furthermore, they have the disadvantage that they must be packed and transported in bent form, thus leading to requirements for larger space for storage or transportation purposes. Japanese Patent Laid-Open Publication No. 145223/1989 (U.S. Pat. No. 4,968,543) disclosed a proposition wherein a metal core is inserted to the molding to provide higher rigidity, but this proposition would require the use of very large bending molds and there would also be the aforementioned problem regarding transportation.

This invention, therefore, intends to provide a molding for vehicles which features a satisfactory decorative function as well as ease of installation and transportation while maintaining required rigidity, and which can be easily extrusion molded continuously, and the production methods thereof.

SUMMARY OF THE INVENTION

To achieve the above purpose, the first embodiment of the invention is a windshield molding for vehicles comprising common sections which are to be mounted almost rectilinearly to the vehicle body and bending sections which are to be bent when being mounted with a structure consisting of a series of extrusion molded bodies for the whole length and of said bending sections made of more flexible material than that of common sections.

The second embodiment of the invention relates to a windshield molding for vehicles comprising common sections which are to be mounted almost rectilinearly to the vehicle body and bending sections which are to be bent when being mounted, said common sections and bending sections being provided with a decorative portion which is exposed toward the outside of the vehicle body and a support leg, which is integrally connected to the decorative portion, projecting from said decorative portion for insertion and fixture onto the car body, said support leg and decorative portion integrally consisting of an extrusion molded monolithic body throughout the whole length of the common sections and bending sections, and said decorative portion having at least its surface facing the outside of the vehicle body, being molded of a single material throughout the whole length including the common sections and the bending sections, and the bending sections of said support leg being molded of more flexible material as compared with that used for the common sections.

The third embodiment is a windshield molding for vehicles comprising common sections which are to be mounted almost rectilinearly to the vehicle body and bending sections which are to be bent when being mounted, said common sections and bending sections being provided with a decorative portion which is exposed toward the outside of the vehicle body and a support leg which is integrally connected to the decorative portion, projecting from said decorative portion for insertion and fixture onto the vehicle body, said support leg and decorative portion integrally consisting of an extrusion molded monolithic body throughout the whole length of the common sections and bending sections, and the surface section which faces the outside of the vehicle of said decorative portion being molded of a single material throughout the length including the common sections and bending sections, and the bending sections including said support leg and the inside section of said decorative portion being molded of more flexible material as compared with that used for the common sections.

The fourth embodiment includes a windshield molding for vehicles comprising a molding which is to be installed along the periphery of windshield glass mounted to the window opening in the vehicle body panel all the way from the upper section of said windshield glass through the corner sections and down the left and right sides and said molding, at least the portion coming to both sides of the windshield glass, projecting from the surface of the windshield glass toward the outside of the vehicle body, and a rainwater retaining groove being formed in said projection, said molding integrally consisting of an-extrusion molded monolithic body throughout the whole length, and said molding, at least the portions coming to the corner sections, being molded of more flexible material as compared with that used for the portion where the rainwater retaining groove is formed.

The fifth embodiment of the invention is a production method of a windshield molding for vehicles, comprising common sections which are to be mounted almost rectilinearly to the vehicle body and bending sections which are to be bent when being mounted, said windshield molding being extrusion molded through dies, such dies being used for extrusion molding of said windshield molding in a monolithic body throughout the whole length, and wherein when forming the bending sections, the molding material being changed to a more flexible type as compared with that used for molding of the common sections.

The sixth embodiment is a production method of a windshield molding comprising a molding which is to be installed along the periphery of windshield glass mounted to the window opening in the vehicle body panel all the way from the upper section of windshield glass through the corner sections down the left and right sides, such molding being extrusion molded through dies, and said molding, at least the portion coming to both sides of windshield glass, projecting from the surface of the windshield glass toward the outside of the vehicle body and a rainwater retaining groove being formed between the projection and the surface of the windshield glass, said molding integrally consisting of an extrusion molded monolithic body throughout the whole length, and when forming said molding, at least for the portions coming to the corner sections, the molding material is changed to a more flexible type as compared with that used for molding of the portion where the rainwater retaining groove is formed.

By means of the aforementioned structures and methods, the common sections and the portion where the rainwater retaining groove is formed are provided with required rigidity through molding by use of more rigid molding material thus achieving satisfactory mounting ease and original shape retention while the bending sections can be easily bent when mounting thanks to the selected use of more flexible molding material.

Furthermore, since at least the outside surface of the decorative portion is molded of the same material throughout the whole length, the appearance of the windshield molding can be maintained in a seamless monolithic appearance.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
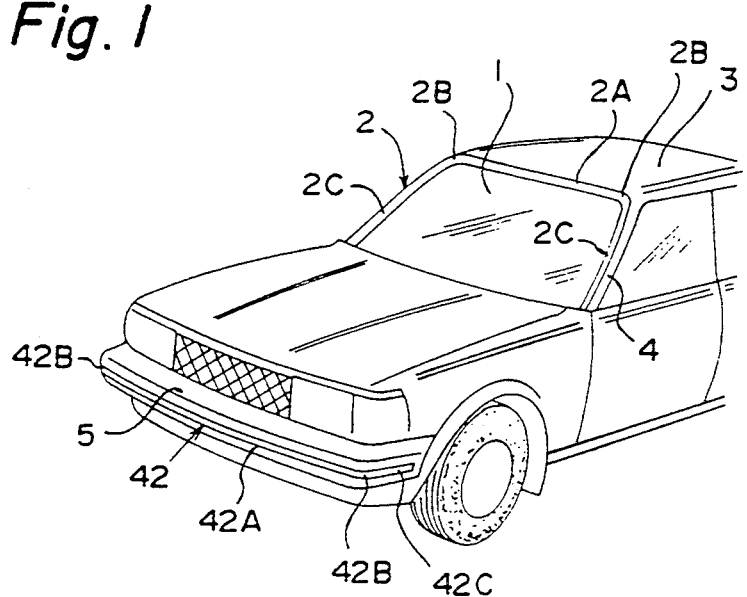
FIG. 1 is an explanatory perspective drawing showing the front section of an automobile featuring the moldings of this invention.

Referring more particularly to the exemplary embodiments of the present invention according to the drawings, as shown in FIG. 1, a windshield molding 2 consisting of a lengthy extrusion-molded monolithic body is installed on the periphery of the front windshield glass 1 of an automobile. Said windshield molding 2 comprises the upper molding section 2A being a section installed in the gap between the upper edge of said windshield glass 1 and the roof panel 3, side molding sections 2C being sections installed in the gap between the edges of both sides of windshield glass 1 and the pillar panel 4, and corner molding sections 2B in the form of bending sections integrally connecting the upper molding section 2A and the side molding sections 2C. These sections 2A, 2B and 2C of the molding are interconnected by the bending sections and are integrally and continuously extrusion molded as is described later herein.

Figure 2:
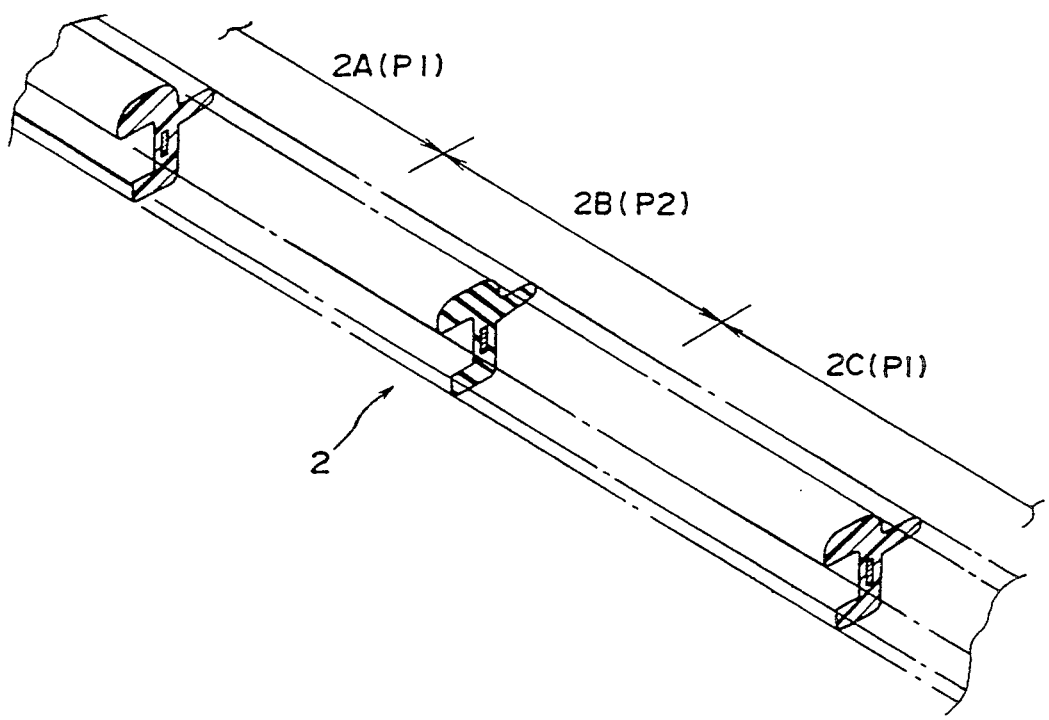
FIG. 2 is an explanatory perspective drawing indicating the extrusion-molded windshield molding used in FIG. 1.
Figure 3:
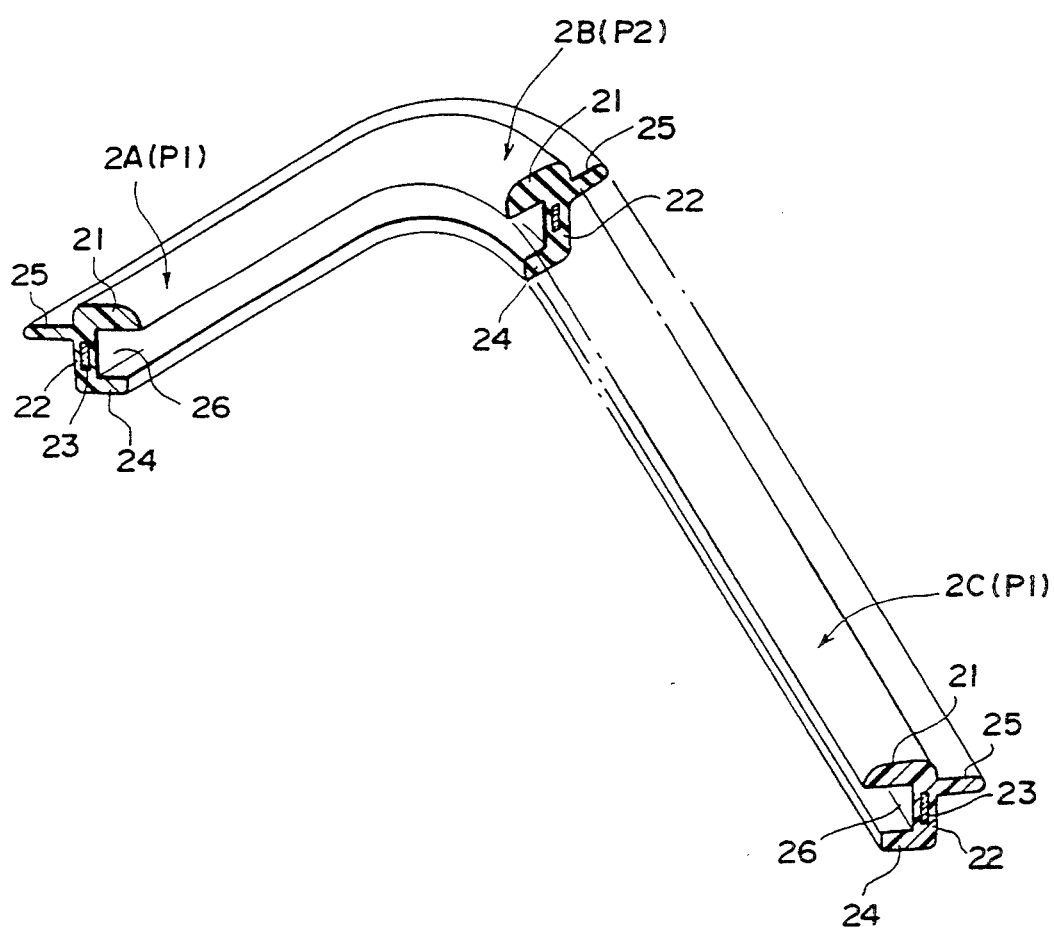
FIG. 3 is an explanatory perspective drawing showing a bent state of the windshield molding as is shown in FIG. 2.

Said windshield molding 2 is usually made of elastic materials such as rubber or synthetic resin, extrusion molded integrally to a lengthy and monolithic shape using an extrusion molding facility as is described later herein and is formed of a certain cross-sectional shape throughout the length as shown in FIGS. 2 and 3. Said windshield molding 2 comprises a support leg 22 for being inserted into the gap between the periphery of windshield glass 1 and roof panel 3 and pillar panel 4, and the decorative part 21 to overlap the position of the gap between the surfaces of windshield glass 1, roof panel 3 and pillar panel 4 from the outside (i.e., the upper side in the drawing) of the vehicle body.

The support leg 22 comprises a lengthy beam-like portion of uniform thickness and shape throughout the whole length of the windshield molding and, inside the support leg 22 near the center position, a metal foil core 23 is built-in as a reinforcement core. Backup flange 24 to hold the edge of windshield glass 1, forms the inside edge (i.e., the lower edge in the drawing) of said support leg 22 and is integrally provided throughout the whole length of the windshield molding, thereby forming a U-shaped groove surrounded by decorative portion 21, support leg 22 and backup flange 24, its cross-section being perpendicular to the longitudinal direction. On the outer surface of support leg 22 in the external direction (i.e., the upper side in the drawing), an elastic lip 25 is integrally provided, projecting so as to reach the wall face of the vehicle body panels 8 and 4 throughout the whole length of the windshield molding.

On the other hand, said decorative part 21 is positioned at the outer edge (i.e., the upper side in the drawing) of support leg 22 and consists of a lip-shaped portion extending inwards to cover the external periphery of windshield glass 1. Decorative portion 21 is also formed in uniform thickness and shape throughout the whole length of the windshield molding and glass-holding groove 26 whose width is approximately the same as the thickness of windshield glass 1, is formed in of a U-shape, being surrounded by said decorative portion 21, support leg 22 and backup flange 24.

The whole span of windshield molding 2 consists of an integrally extrusion-molded monolithic body, however, the common sections including the side molding sections 2C and the upper molding section 2A are molded using a comparatively rigid material P1, while the bending sections or corner molding sections 2B are molded of more flexible material P2 as compared with material P1 with more rigidity being used for said side molding sections 2C and upper molding section 2A. A molding material reinforced by glass fiber is a practical example of rigid material P1.

Referring next to the mounting structure of windshield glass 1 to the vehicle body using said windshield molding 2, the inside edge of the windshield glass opening surrounded by roof panel 3 and pillar panel 4 is bent inwards toward the vehicle interior in a stepped shape, to accept windshield glass 1.

First, a lengthy dam-rubber belt is fixed either to the peripheral edges of windshield glass 1 or onto the surface of the flange provided on the stepped edge of the windshield glass opening surrounded by the vehicle body panels 3 and 4 and an adhesive is extruded onto the peripheral edges outside the dam-rubber before the internal peripheral edge of windshield glass 1 is pressed onto said dam-rubber. Windshield glass 1 is then fixed at a uniform height all around above the flanges of the vehicle body panels 3 and 4. Windshield molding 2 can either be mounted over the windshield glass before being inserted into the window opening, or inserted into the gap between the periphery of windshield glass 1 and vehicle body panels 3 and 4, said windshield glass 1 having been fixed to the window opening in advance.

When the windshield molding 2 is inserted into the gap formed between the periphery of windshield glass 1 and the vehicle body panels 3 and 4, the glass holding groove 26 formed by the backup flange 24 and the decorative portion 21 holds the peripheral edge of windshield glass 1 all around the length of the windshield molding, while the elastic lip 25 is inserted in bent form inside the stepped wall surface of the vehicle body panels 3 and 4. The elastic rebound force of the thus bent elastic lip 25 and the holding force of said glass holding groove work as a temporary fastening force until the adhesive hardens, while working to maintain the original positions.

When the windshield molding 2 is thus installed, the common sections including the upper molding section 2A and the side molding sections 2C, being provided with a higher rigidity by use of the rigid material P1, maintain their shape and original positions, while the bending sections or corner molding sections 2B, having been provided with required flexibility by use of the more flexible molding material P2, can be easily bent upon installation and are free from wrinkles which would otherwise occur due to the difference in the lengths of the inner and outer bending circumferences.

Figure 4:
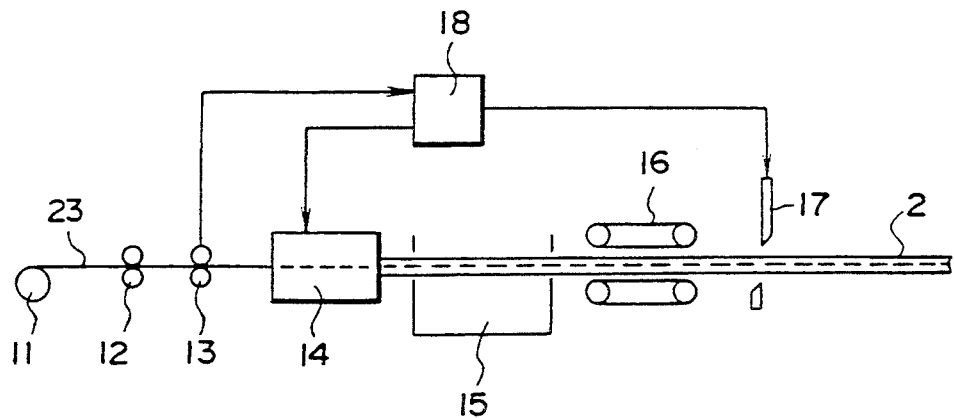
FIG. 4 is an explanatory side view of the overall structure of the extrusion molding facility for production of the windshield moldings as are shown in FIGS. 2 and 3.
Figure 5:
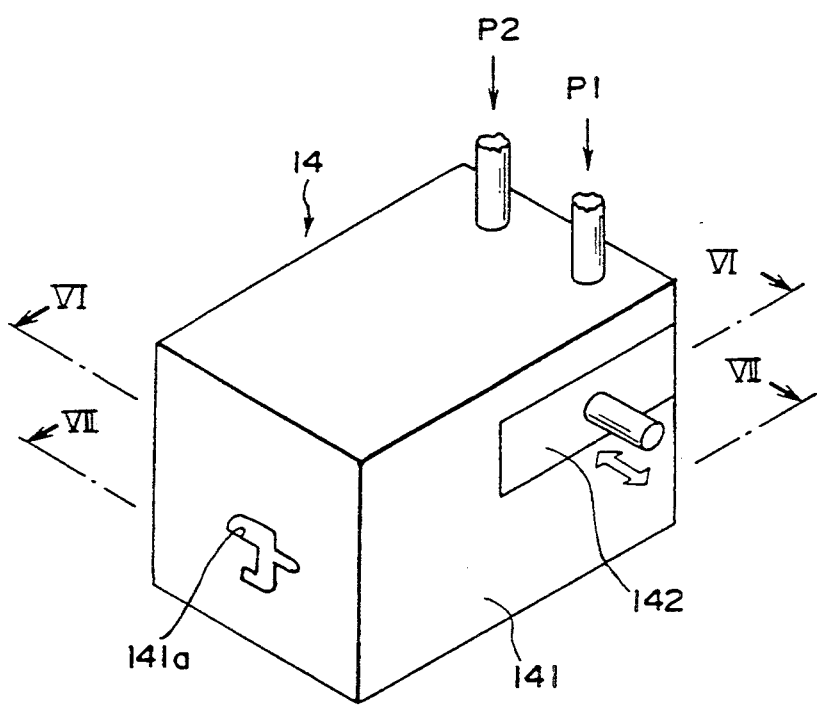
FIG. 5 is an explanatory perspective drawing showing the dies to be used for the extrusion molding facility as is shown in FIG. 4.
Figure 6:
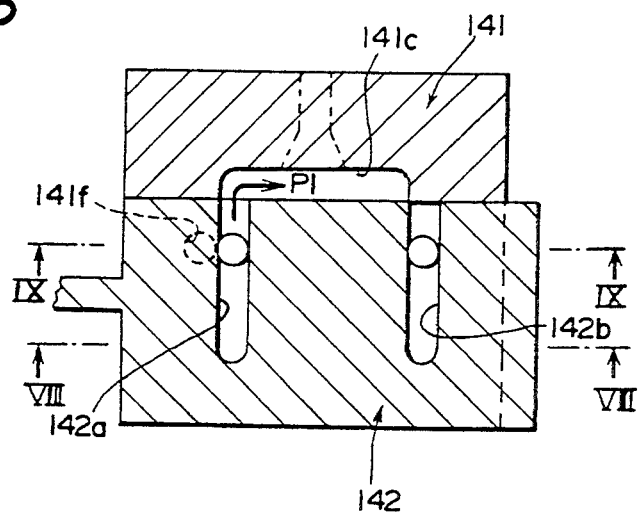
FIG. 6 is a horizontal sectional view taken along line VI—VI in FIG. 5.
Figure 7:
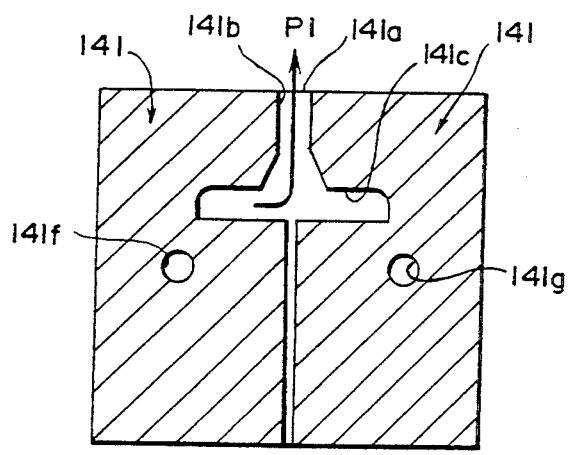
FIG. 7 is a horizontal sectional view taken along line VII—VII in FIG. 5.
Figure 8:
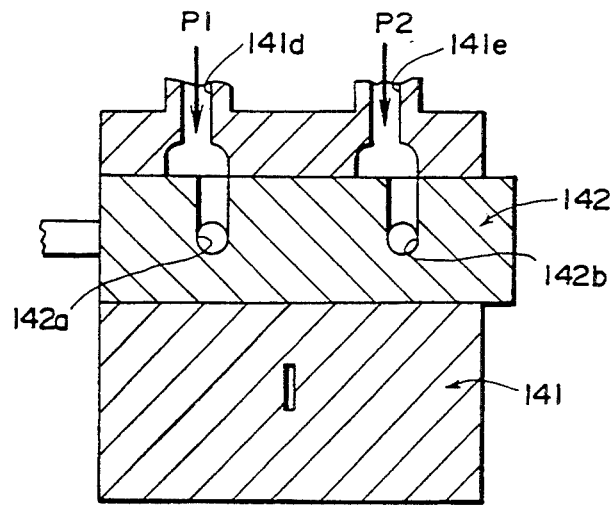
FIG. 8 is a cross-sectional view taken along line VIII—VIII in FIG. 6.
Figure 9:
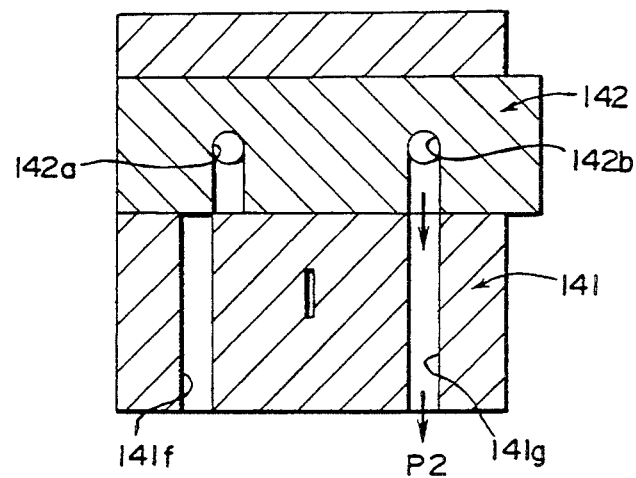
FIG. 9 is a cross-sectional view taken along line IX—IX in FIG. 6.

Referring next to the facility to mold said windshield molding 2, as shown in FIG. 4, the insert material 23 unrolled from coiler 11 is fed into the extruder dies 14 through forming roll 12 and sensing equipment 13, before being extruded into said cross-sectional shapes integrally with synthetic resin materials. The extruded windshield molding is fed through cooling bath 15 to cutter 17 by drawing apparatus 16 for cutting to the prescribed length.

During said processes, the information on the feeding rate of insert material 23 as detected by said sensing equipment 13, is input to controller 18, and, based on such input signals, the timing of operations of said extruder 14 and cutter 17 are determined and controller 18 accordingly outputs actuating signals to said extruder 14 and cutter 17. The installation position of the sensing equipment can be freely selected insofar as the feeding rate or moving rate of the material may be detected at such position; for example, at a position upstream or downstream of drawing apparatus 16.

Referring now to the dies used as the extruder 14, as shown in FIGS. 5 to 12, said dies are provided with a changeover mechanism for the extruding materials. Namely, the first die 141 of extruder 14 is provided with a shaped extrusion opening 141a which opens to the front end of the die, and a reservoir space 141c is provided at the bottom of extruding path 141b. The second die 142 is mounted facing the reservoir space 141c so that it can move reciprocally perpendicular to the extruding direction. Changeover channels 142a and 142b are provided in parallel in said die 142 and each of said pair of changeover channels is so designed as to open alternately into the reservoir 141c of the first die 141 by the reciprocal movement of the second die 142 in the horizontal direction.

In said first die 141, a pair of material feed channels 141d and 141e and a pair of material discharge channels 141f and 141g are provided. Said pair of material feed channels 141d and 141e and pair of material discharge channels 141f and 141g are positioned opposite each other across the pair of changeover channels 142a and 142b of the second die 142. The material feed channels 141d and 141e are designed so as to be always open into the changeover channels 142a and 142b, while the material discharge channels 141f and 141g are designed so as to be only open alternately into either of the changeover channels 142a and 142b. From said material feed channel 141d, more rigid material P1 is fed for molding of the side molding sections 2C and the upper molding section 2A, while from the material feed channel 141e, more flexible material P2 is fed to mold the corner molding sections 2B.

When extrusion molding the side molding sections 2C, the first die 141 and the second die 142 are set to the relative positions as shown in FIGS. 6 to 9. At this time, one of changeover channels 142a of the second die 142 opens into reservoir 141c in the first die 141, while the other changeover channel 142b closes. Through the channel connections, as shown by arrows in the drawings, only the more rigid material P1, fed through the material feed channel 141d into changeover channel 142a, goes into the extrusion channel 141b of the first die 141 before being extruded out through the shaped extrusion opening 141a. At this time, with the other changeover channel 142b being connected to material discharge channel 141g, the more flexible material P2 is fed through the material feed channel 141e into the changeover channel 142b and is then discharged to the prescribed position outside the extruder through the material discharge channel 141g.

Figure 10:
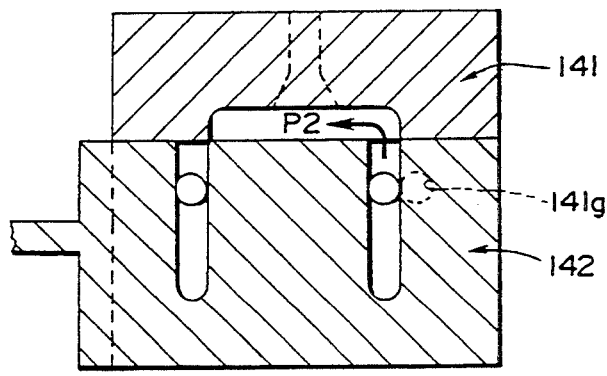
FIG. 10 is a cross-sectional view showing the shifting status of the dies for the extrusion molding facility as is shown in FIG. 6.
Figure 11:
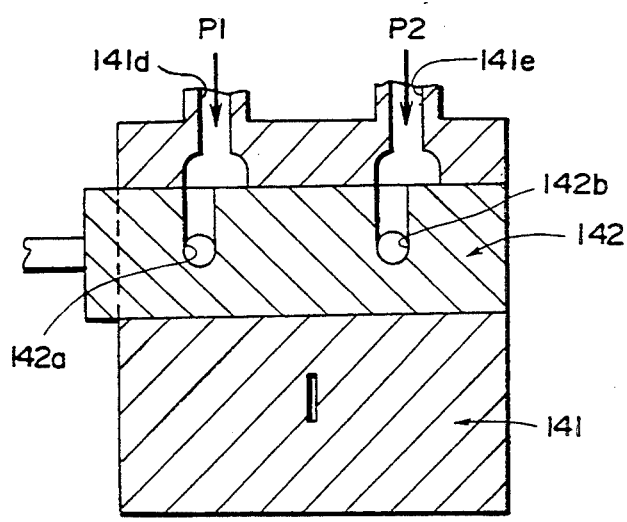
FIG. 11 is a cross-sectional view showing the shifting status of the dies for the extrusion molding facility as is shown in FIG. 8.
Figure 12:
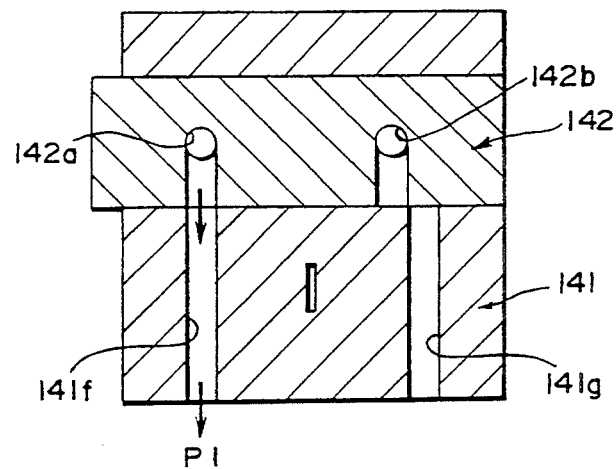
FIG. 12 is a cross-sectional view showing the shifting status of the dies for the extrusion molding facility as is shown in FIG. 9.

Next, when extruding the corner molding sections 2B, the first die 141 and the second die 142 are set to the relative positions as shown in FIGS. 10 to 12. Then, the other changeover channel 142b of the second die 142 opens into reservoir 141c of the first die 141 while the other changeover channel 142a closes. These channel connections, as shown by arrows in the drawing, permit only the more flexible material P2 to be fed through the material feed channel 141e into the changeover channel 142b then extruded from the extrusion opening 141a after passing through the extrusion channel 141b of the first die 141. At this time, with the other changeover channel 142a being connected to the material discharge channel 141f, the more rigid material P1 is fed through the material feed channel 141d into the changeover channel 142a then discharged to the prescribed position outside the extruder through the material discharge channel 141f.

Figure 13:
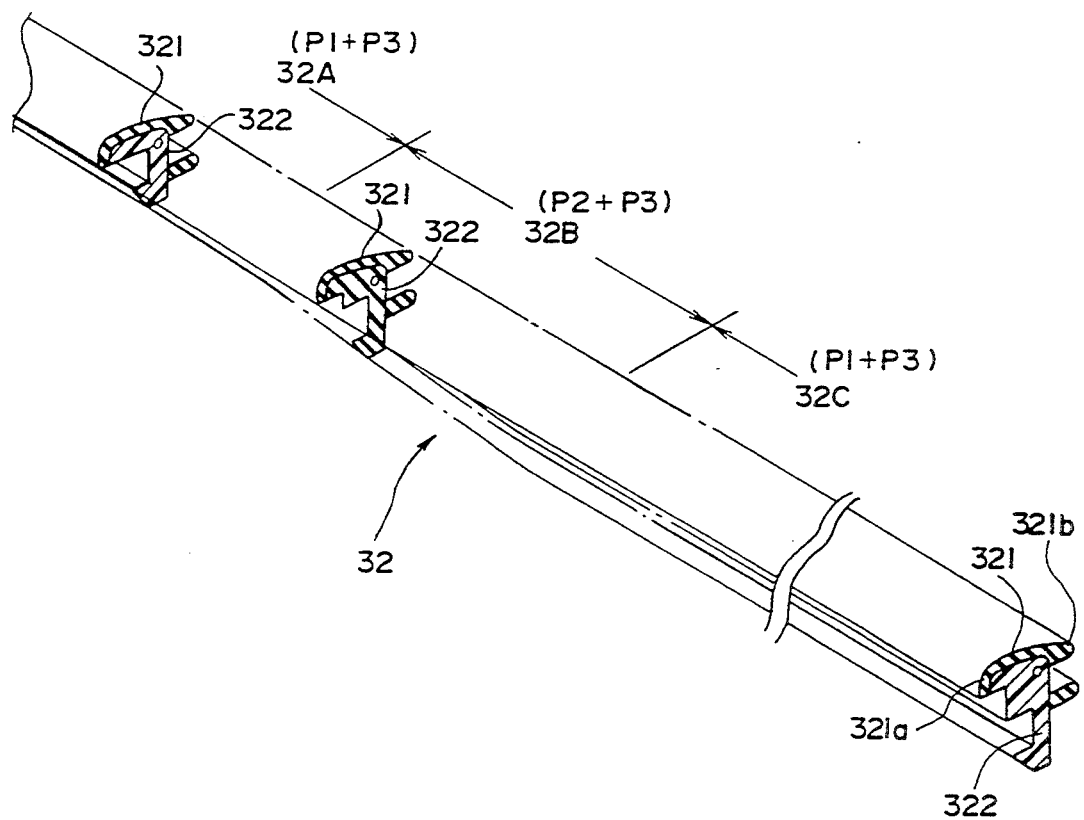
FIG. 13 is an explanatory perspective drawing corresponding to FIG. 2 and indicating the extruded state of a windshield molding in another embodiment of this invention.
Figure 14:
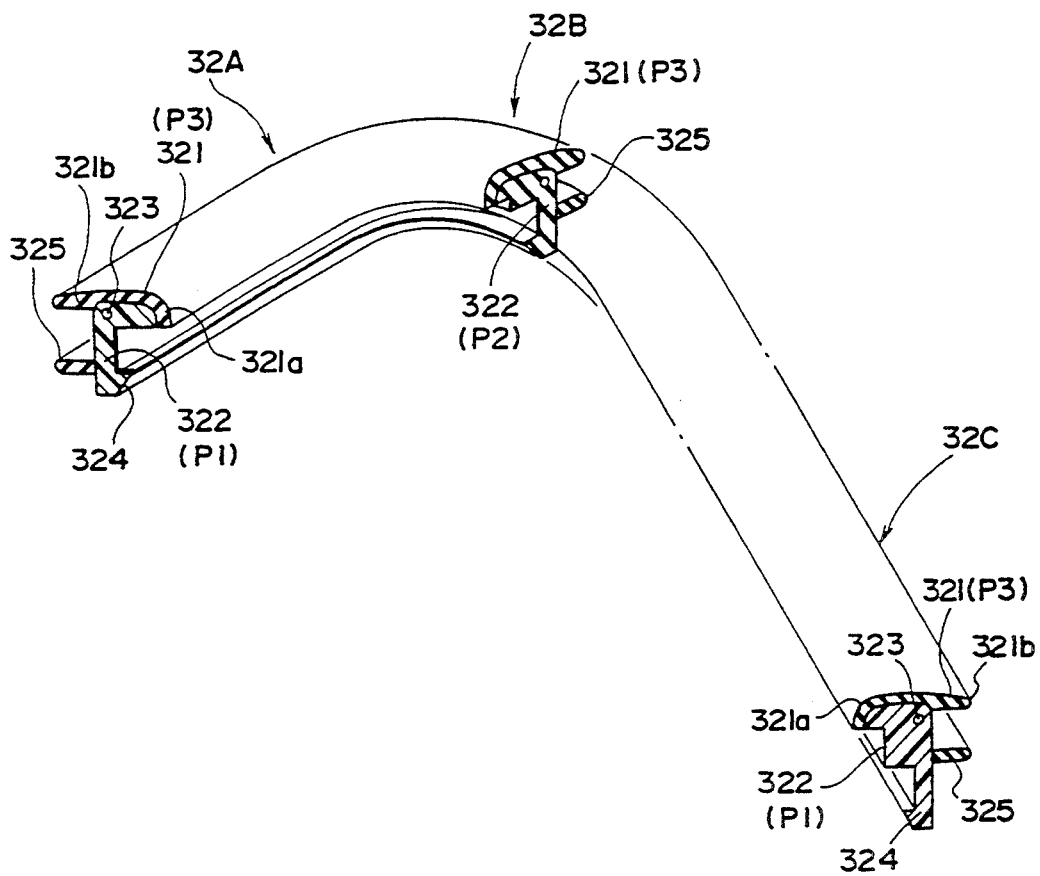
FIG. 14 is an explanatory perspective drawing corresponding to FIG. 3 indicating a bent state of the windshield molding as is shown in FIG. 13.

The windshield molding 32 of the second embodiment of this invention as is shown in FIGS. 13 and 14 comprises, the common sections including the upper molding section 32A to be inserted into the gap between the upper periphery of the windshield glass and the roof panel, and the side molding sections 32C which are to be inserted between the side peripheries of the windshield glass and the pillar panels at both sides, and the bending sections or corner molding sections 32B connecting the upper molding section 32A and the side molding sections 32B in bent form, said moldings 32A, 32B and 32C being integrally extrusion-molded in a lengthy monolithic body.

Said windshield molding 32 is extrusion molded using elastic materials such as rubber or synthetic resins through an extruder such as that described below into a lengthy monolithic body and is provided with a support leg 322 which fills the gap between the periphery of the windshield glass and the vehicle body panel as well as with a decorative portion 321 which covers the external side of the space between the periphery of the windshield glass and the vehicle body panels. The cross-section perpendicular to the longitudinal direction formed by decorative portion 321 and support leg 322 is of a T-shape.

Said support leg 322 comprises the common sections including the side molding sections 32C and the upper molding section 32A which are made of more rigid material P1 and the bending section or corner molding sections 32B which are molded of more flexible material P2. Inside the support leg 322, at the connection section with said decorative part 321, a metal wire 323 is built-in as a reinforcing core. On the internal edge of the support leg 322, a backup flange 324 is provided throughout the whole length to support the windshield glass from the inner periphery. Surrounded by said backup flange 324 and said decorative part 321, a glass holding groove of uniform U-shape in its cross-section is formed throughout the whole length to accept the periphery of the windshield glass. Also, on the back of said support leg 322, elastic lip 325 projecting toward the inner wall surface of the vehicle body panels, is provided throughout the whole length. Said elastic lip 325 is made throughout its whole length, of more flexible material P3.

Said decorative part 321 consists of a glass-side decorative portion 321a and a panel-side decorative portion 321b which are to extend toward the windshield glass side and the vehicle body panel side, respectively, being molded with a uniform thickness and shape throughout the whole length of the windshield molding. The external surface area of said decorative portion 321 is made of an elastic material P3, the same as used for said elastic lip 325, while the inner core area of the decorative portion 321 is made of the more rigid material P1, the same as used for said support leg 322 (at the side and upper molding sections), or of the more flexible material P2, the same as used for said support leg 322 (at the corner molding sections).

The height, or thickness, of the support leg 322 varies corresponding to the bending depth of the vehicle body panels, and the support leg height is set comparatively shorter along the upper molding section 32A and thicker along the side molding sections 32C. In the range of the side molding sections 32C where the height of the support leg 322 increases, thickened body portions are provided by extending the support leg portion toward the inside of the window opening, and a rainwater retaining groove is formed which is surrounded by the internal surface of said thickened body portion and the glass-side decorative portion of the decorative part 321. The size of the rainwater retaining groove facing toward the inner side of the window opening varies in proportion to the extended height of the thickened body portions of the support leg 322. It is possible to provide such thickened body portions along the support leg 322 as is proposed in Japanese Patent Laid-Open Publication No. 128721/1991.

With such windshield molding 32 of the second embodiment of this invention, the rigidity of the common sections, especially of the sections forming the rainwater retaining groove, is increased by the use of a more rigid material P1, and the original position and shapes of the windshield molding are steadily maintained both during and after installation. Also, the bending ease of the bending sections, or the corner molding sections 32, is maintained at a satisfactory level for easier installation of the windshield molding in a bent state, said sections being free from wrinkles which would otherwise occur due to the difference in the lengths of the inner and outer bending circumferences.

Since the decorative part 321 which constitutes the external appearance of the whole windshield molding is made of the same synthetic resin material P3 throughout the whole length, the external appearance of the windshield molding is maintained in a seamless and satisfactory state.

Figure 15:
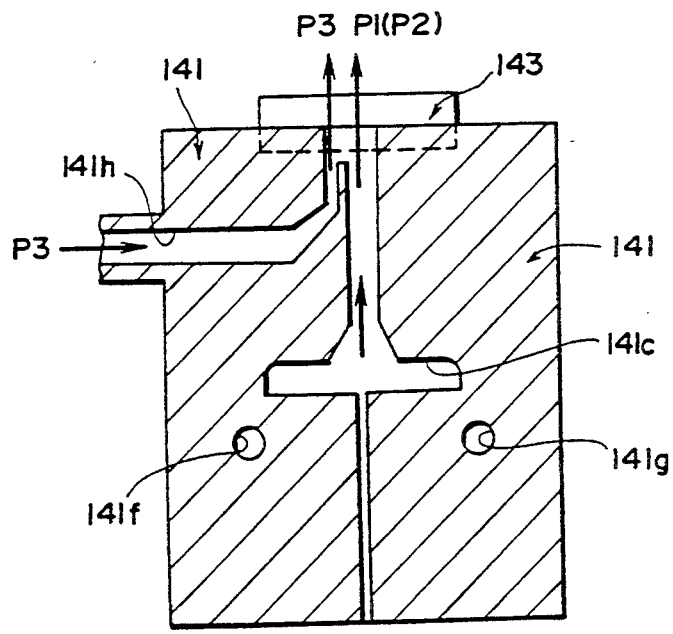
FIG. 15 is a horizontal sectional view corresponding to FIG. 7 and showing the extrusion molding dies for the windshield molding as is indicated in FIGS. 13 and 14.

Referring again to the molding facility of said windshield molding 32, although the facility is provided with an almost identical material changeover mechanism as that of the windshield molding 2 of the first embodiment of this invention, an additional material feed channel for the elastic material P3 is added to the facility. As shown in FIG. 15 which depicts the same structure and symbols as in FIG. 7, the first die 141 is provided with an additional material feed channel 141h for molding said decorative section 321, being used for its external surface area, and said elastic lip 325. The external surface area of the decorative part 321 and the elastic lip 352 are molded by said elastic material P3 being constantly fed through said material feed channel 141h for the whole length of the windshield molding.

The symbol 143 in FIG. 15 represents a third die which moves reciprocally on the front end of the first die 141 and by movement of said third die 143, the resultant shape of the extrusion opening 141a varies, thus changing the cross-sectional shape of the windshield molding while being extruded.

Referring now to the embodiment of the bumper molding of this invention as shown in FIGS. 16 to 19, the bumper molding 42 is made of rubber or synthetic resins extrusion-molded integrally and continuously. As shown in FIG. 1, it comprises common sections including the front molding section 42A and the side molding sections 42C which are to be installed to the sides of the bumper 5 in a straight line, and bending sections, or corner molding sections 42B, which are to be installed in curved form on the corner surfaces of the bumper 5.

Figure 16:
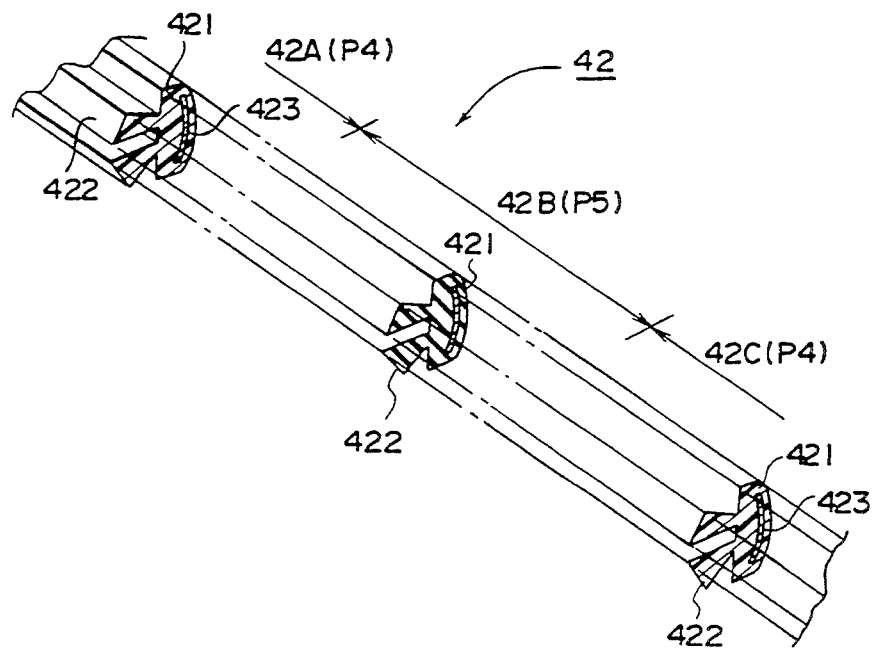
FIG. 16 is an explanatory perspective drawing corresponding to FIG. 2 showing the extruded status of a bumper molding in another embodiment of this invention.
Figure 17:
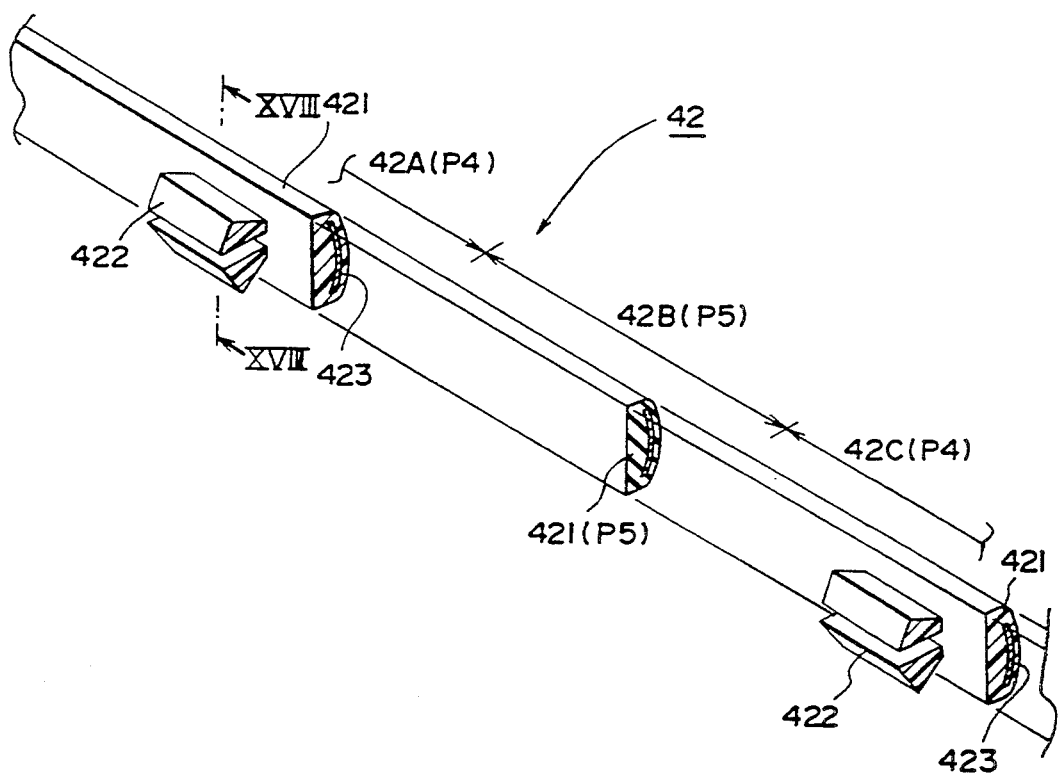
FIG. 17 is an explanatory perspective drawing showing the molded status of the support leg of the bumper molding as is shown in FIG. 16.
Figure 18:
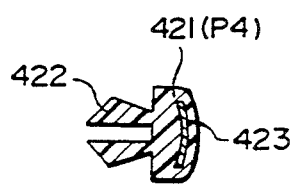
FIG. 18 is a cross-sectional view at section XVIII—XVIII in FIG. 17.
Figure 19:
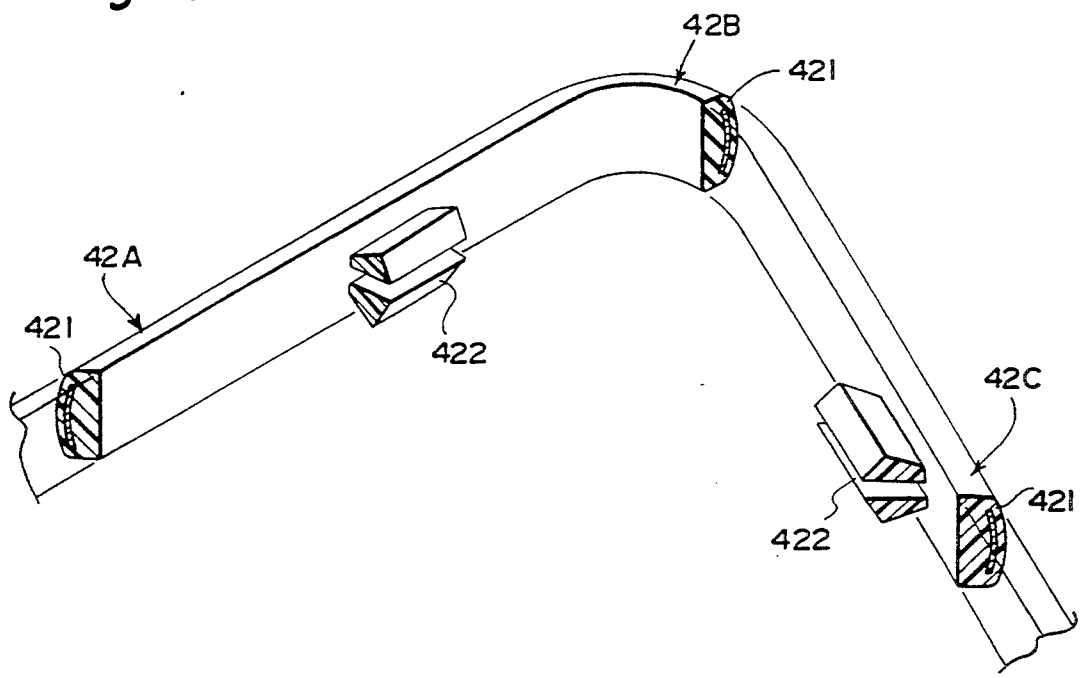
FIG. 19 is an explanatory perspective drawing corresponding to FIG. 8 showing the bent state of the bumper molding as is shown in FIG. 17.

Said bumper molding 42 is provided with decorative portion 421 which is exposed externally, and snap-in legs 422 projecting from the rear surface of the decorative portion 421, which are inserted and fixed to bumper 5. Said decorative portion 421 is of a D-shape in its cross-section and contains built-in metal foil core material 423 of arched shape positioned nearer the arched surface of bumper molding 42. The snap-in legs 422 project in a twin forked shape and their top ends are formed in an arrowhead shape to locate into the bumper 5 when snapped-in. When molding said snap-in legs 422, the contour is first extruded throughout its length with a uniform cross-section together with the decorative portion 421 as shown in FIG. 16, before unnecessary sections are cut off in a cutting process. Thus, a bumper molding as shown in FIG. 17 is completed having multiple pairs of snap-in legs 422 positioned along the longitudinal direction.

Said bumper molding comprises common sections including the front molding section 42A and the side molding sections 42C being made of a more rigid material P4 such as hard PVC, while the bending sections, or corner molding sections 42B, are made of an elastic material P5, for example, soft PVC.

When mounting the bumper molding 42 to bumper 5, the common sections, namely, the front molding section 42A and the side molding sections made of a more rigid material P4, can be easily mounted, and the original position and shapes can be steadily maintained after installation. In addition, since the bending sections or corner molding sections 42B, are made of an elastic material P5, bending work is easy to perform, and, also, they are free from wrinkles which would otherwise occur due to the difference in the lengths of the inner and outer bending circumferences.

Figure 20:
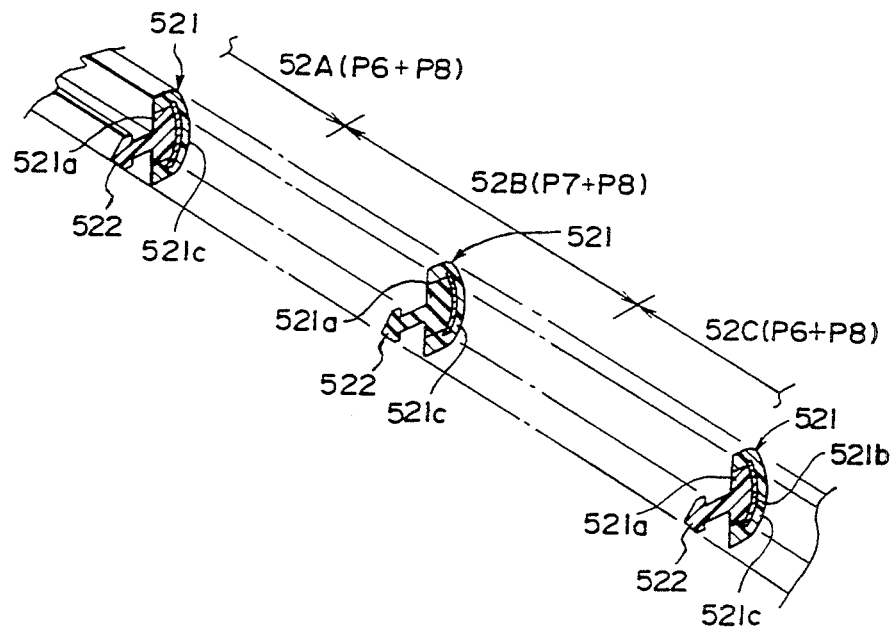
FIG. 20 is an explanatory perspective drawing corresponding to FIG. 2 showing the extruded status of a bumper molding of another embodiment of this invention.
Figure 21:
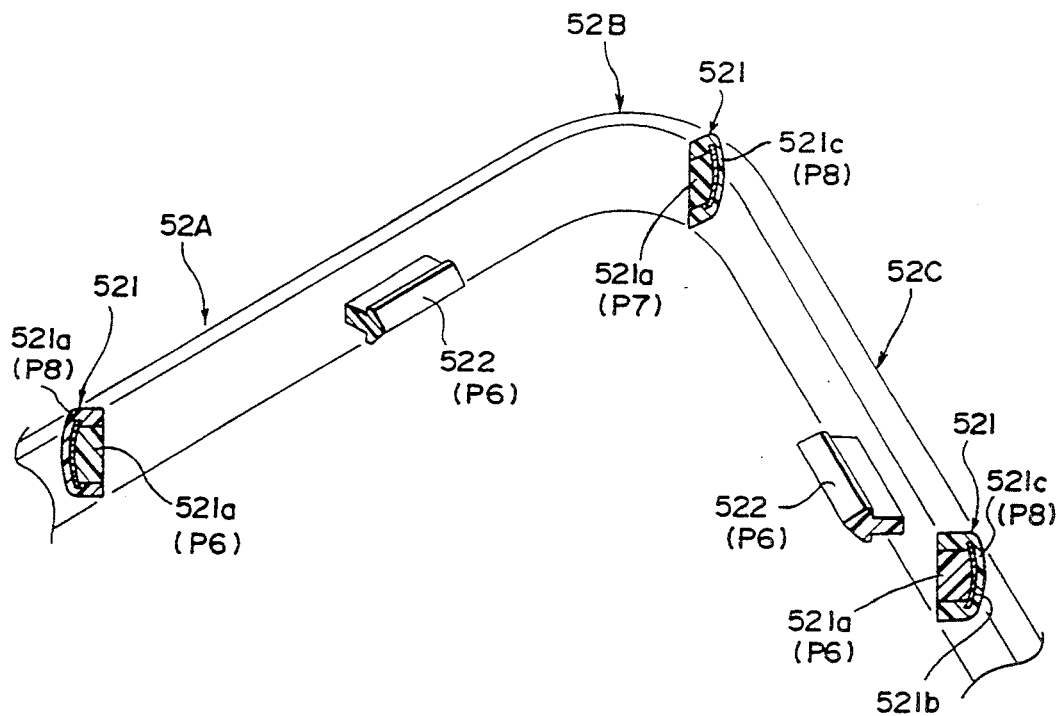
FIG. 21 is an explanatory perspective drawing corresponding to FIG. 8 showing the bent state after the support leg of the bumper molding is formed as is shown in FIG. 20.

A bumper molding 52 of another embodiment of this invention as is shown in FIGS. 20 and 21 is made of rubber, synthetic resins, etc. in a prescribed laminated structure extrusion molded integrally and continuously and consists of common sections including the front molding section 52A, the side molding sections 52C and the bending sections, or corner molding sections 52B, which link the front and side molding sections.

Said bumper molding 52 is provided with a decorative portion 521 which is exposed externally and a snap-in leg 22 which projects from the decorative portion 521 toward the bumper, said decorative portion 521 and snap-in leg 522 constituting a T-shaped cross-section perpendicular to the longitudinal direction. The decorative portion 521 comprises the body 521a in a D-shaped cross-section which is molded integrally with the snap-in leg 522, and a laminated film 521b which is applied to the surface of the body 521a, said film being covered by a transparent resin layer 521c. For example, a black colored ionomer resin can be used for said body, a polyester film with evaporated aluminum coating on both sides and a surface coating of an ethylene copolymer can be used for said laminated film 521b, and a colorless and transparent ionomer resin can be used for the transparent resin surface layer.

The top end of said snap-in leg 522 is of an arrowhead shape and is inserted into the bumper for fixing. Said snap-in leg section 522 is first extruded with the same cross section throughout the length of the molding together with said decorative part 521 using a prescribed extruder as shown in FIG. 20, before unnecessary portions are cut off during a cutting process. Thus, a bumper molding is completed wherein multiple units of snap-in legs 522 are positioned along the longitudinal direction as shown in FIG. 21. As aforementioned, such snap-in legs 522 are originally extruded integrally with the body 521a of the decorative portion 521.

The transparent synthetic resin surface layer 521c constituting the decorative portion 521 is made of a uniform synthetic resin material P8 throughout the length of the molding. Whereas, materials for molding, whereas the body 521a of the decorative portion 521 and the snap-in legs 522 are changed-over along the lengths of the molding similar to the cases of the aforementioned embodiments of this invention. Namely, for the common sections including the front molding section 52A and the side molding section 52C, the body 521a and the snap-in legs 522 are made of a more rigid material P6, while for the bending sections or the corner molding sections 52B, the body 521a and the snap-in legs 522 are made of an elastic material P7.

When mounting the bumper molding 52 to a bumper 5, therefore, the common sections, namely the front molding section 52A and the side molding sections 52C, can be installed easily and maintain their original shape and attitude due to the rigidity of the more rigid material P6, while the bending sections, or corner molding sections 52B, can be easily bent owing to the flexibility of the elastic material P7 and are free from wrinkles which would otherwise occur due to the difference in the lengths of the inner and outer bending circumferences.

Furthermore, since the transparent surface synthetic resin layer 521c on the decorative portion 521 which constitutes the appearance of the molding is made of a single synthetic resin material P8 throughout the whole length, a seamless and uniform external appearance of the molding can be maintained.

Referring next to a molding 62 which constitutes a windshield molding for front windshield glass of a vehicle as shown in FIGS. 22 to 26, said molding 62 consists of the upper molding section 62A which is to be inserted into the gap between the upper periphery of the front windshield glass 1 and the roof panel 3, the side molding sections 62C which are inserted into the gap between the side edges of windshield glass and the pillar panel 4 and the corner molding sections 62B which connect the upper molding section 62A and the side molding sections 62C in bent form, such molding consisting of sections 62A, 62B and 62C which are extruded integrally and continuously as described below.

Figure 22:
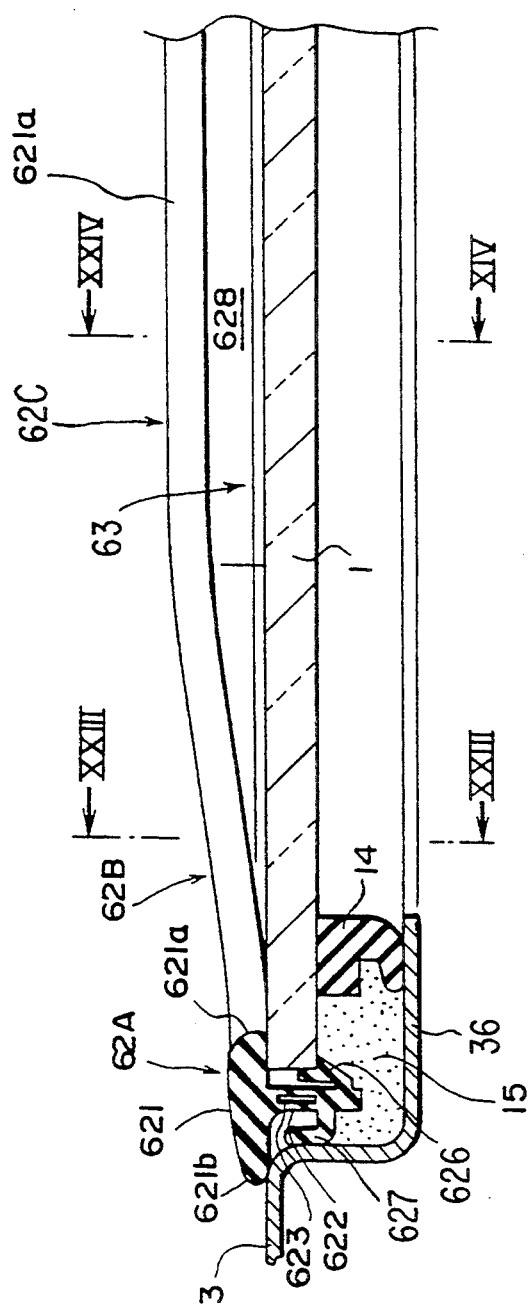
FIG. 22 is a cross-sectional view showing an installed status of a windshield molding in another embodiment of this invention.
Figure 23:
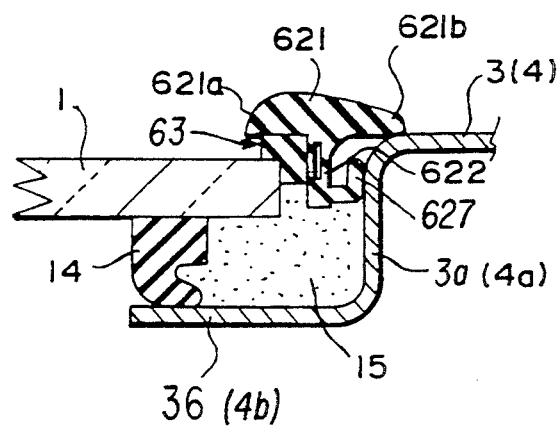
FIG. 23 is a cross-sectional view taken along line XXIII—XXIII in FIG. 22.
Figure 24:
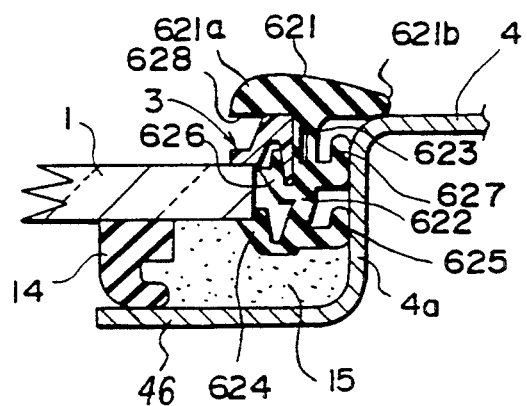
FIG. 24 is a cross-sectional view taken along line XXIV—XXIV in FIG. 2.

The molding 62 comprises a support leg 622 to be installed into the gap between the periphery of windshield glass 1 and the roof panel 8 and the pillar panel 4, and a decorative portion 621 which covers the space between the peripheral surfaces of the windshield glass and the inner surfaces of the roof panel 3 and the pillar panel 4, from outside (upper side in FIGS. 22, 28 and 24). Said decorative portion 621 and support leg 622 constitute a T-shaped cross-section in perpendicular to the longitudinal direction.

Figure 25:
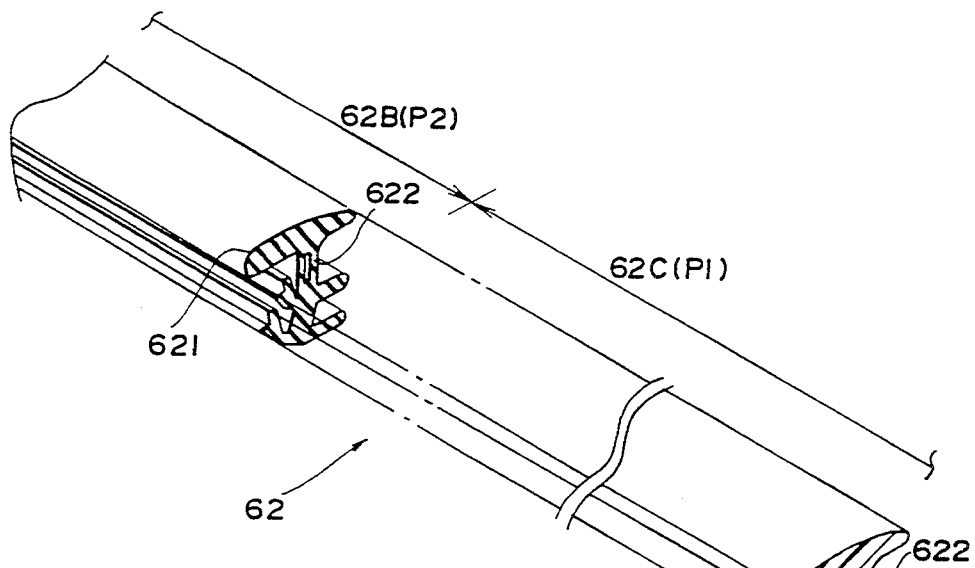
FIG. 25 is an explanatory perspective drawing showing the molding, as is shown in FIGS. 22 and 24, right after extrusion and before being cut off.

Inside the above support leg 622, at a position closer to the connecting section with the decorative part 621, a metal foil core 628 is inserted as a reinforcement core. At the deep end (the lower end in FIG. 24) of the support leg 622, the first backup flange 624 and the first elastic lip 625 project toward the inner and outer directions, respectively, of the front windshield opening and midway of the height of the support leg, the second backup flange 626 and the second elastic lip 627 project toward the inside and outside directions, respectively, of the front windshield opening. Said first backup flange 624 and said first elastic lip 625 are provided only in the side molding sections but not in the upper and corner molding sections. Said backup flange 624 and elastic lip 625 are first extruded all the way along the whole length of the molding as shown in FIG. 25 before the portions coming to the upper and corner molding sections are cut off together with a part of the support leg during the cutting process.

Figure 26:
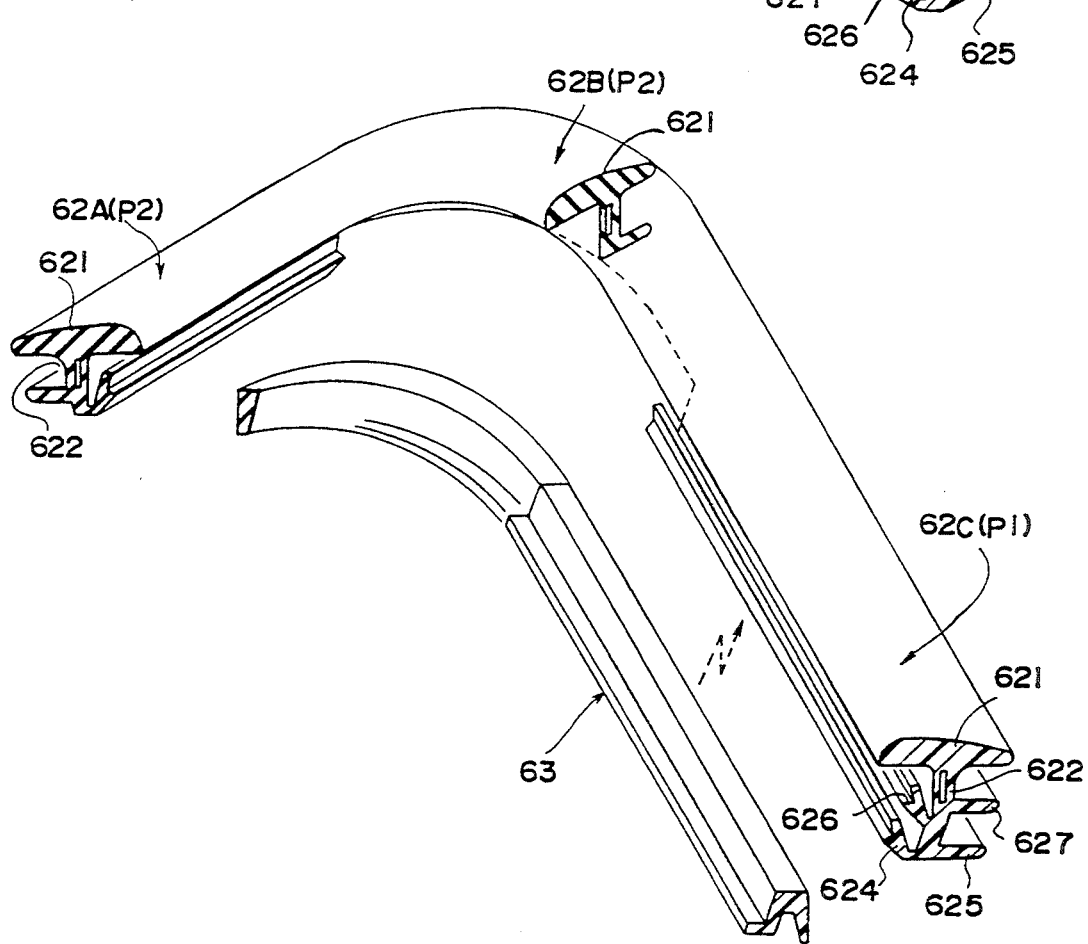
FIG. 26 is an explanatory perspective drawing showing the molding, as is shown in FIGS. 22 and 24, and bent for installation.

The second backup flange 626 is provided in the side and upper molding sections but not in the corner molding sections. Said second backup flange 626 too, is first extruded along the whole length of the molding (FIG. 25) before the portions coming to the corner sections are cut off during the cutting process (FIG. 26). Said second elastic lip 627 is not cut off however, and is provided throughout the whole length of the side molding, corner molding and upper molding sections.

The decorative portion 621 consists of a glass-side decorative section 621a which extends from the outer end (upper end in FIGS. 22, 23 and 24) of the support leg 622 toward the inside of the windshield glass 1, and a panel-side decorative section 621b which extends from the outer end of the support leg 622 toward the vehicle body panel side. Said glass-side decorative section corresponds to a lip structure covering the outer periphery of windshield glass 1, while said panel-side decorative section corresponds to a lip structure covering the outer edge surfaces of the windshield opening in the vehicle body panel. Such glass-side decorative section 621a and panel-side decorative section 621b are formed with a uniform thickness and shape throughout the whole length of the windshield molding.

Here, the side molding sections 62C are made of a more rigid material P1, while the corner molding sections 62B and the upper molding section 62A are made of a more flexible material P2 as compared with the material P1 of the side molding sections 62C. As an example of said more rigid material, a material mixed with fiber glass can be used.

Referring next to the installation of windshield glass 1 to the vehicle body using said windshield molding 62, the inner edge section of the windshield glass opening surrounded by The roof panel 3 and the pillar panels 4 is bent inwards in a stepped shape to accept windshield glass 1 and along the other end of such steps 3a or 4a, flange 3b and 4b are provided. Although the width of the step 3a along the upper section is even, the width of the step 4a along the side sections widens gradually starting midway along the corner sections.

First, an auxiliary molding 63 is installed along the corner section through the side section of the molding 62. Such auxiliary molding 63 is installed into the interior angle between the glass-side decorative section 621a and the support leg 622 and is held by joining with the second backup flange 626 of the windshield molding 62. The section of said auxiliary molding 63 corresponding to the side molding section is molded into an appropriate sectional shape matching said backup flange 626, while the sectional shape of the section corresponding to the corner section varies by continuous changing in order that the gap between the windshield molding 62 and windshield glass 1 may be properly filled. Such section coming to the corner section is molded by injection molding, etc. and is made of a more flexible material P2 similar to the case of the aforementioned windshield molding 62, while the section coming to the side section is made of a more rigid material P1.

First, a lengthy shaped dam-rubber belt 14 is attached either to the peripheral edges of windshield glass 1 or onto the surface of the flanges 3b and 4b provided on the stepped edges of the vehicle body panels 3 and 4 and adhesive 15 is extruded over the peripheral edges outside the dam-rubber belt 14 before the internal peripheral edges of windshield glass 1 are applied to said dam-rubber. Thus, windshield glass 1 is held in place evenly around its entire edge by flanges 3b and 4b of the vehicle body panels 3 and 4 producing difference in level, corresponding to the bending depth of steps 3a and 4a, between the external peripheral surface of windshield glass 1 and the surfaces of the vehicle panels 3 and 4.

Under such condition, the windshield molding is inserted into the gap between the periphery of windshield glass 1 and the vehicle body panels 3 and 4. At this time, in the upper molding section as shown in FIG. 22, the clearance between the backup flange 626 of the upper molding section 62A and the glass-side decorative section 621a holds the upper periphery of windshield glass 1, while in the side molding section as shown in FIG. 24, the clearance between the backup flange 624 and the glass-side decorative section 621a holds the side peripheries of windshield glass 1 via the auxiliary molding 63. In the corner section as shown in FIG. 28, a portion of the auxiliary molding 63 is sandwiched between the glass-side decorative section 621a of the corner molding section 62B and windshield glass 1. While the elastic lips 625 and 627 are applied to steps 3a and 4a in bent form, such holding force by backup flanges 624 and 626 of windshield glass edge and the elastic rebounding force of the elastic lips 625 and 627 in bent form work to provide a temporary fastening force and position retaining force until adhesive 15 hardens.

When installing the windshield molding, the corner molding sections 62B need to be bent to a prescribed curvature but since the corner molding sections 62B are made of a more flexible material P2, they can be easily bent when mounting and are free from wrinkles which would otherwise occur due to the difference in the lengths of the inner and outer bending circumferences.

When the windshield molding is thus installed, in the upper molding section (refer to FIG. 22), the front surface of windshield glass 1 and that of the vehicle body panel 3 are almost level, ensuring that the glass-side decorative section 621a is stuck fast to the front peripheral surfaces of windshield glass 1. In the corner section (refer to FIG. 23), as the level difference between the aforementioned two surfaces gradually increases, the glass-side decorative section 621a starts to separate gradually from the surface of windshield glass 1 by the sandwiched thickness of said auxiliary molding 63. Such level difference increases gradually from midway along the corner molding section toward the side molding section as the sandwiched thickness of the auxiliary molding gradually increases and, correspondingly, the separation from the peripheral surface of windshield glass 1 of the glass-side decorative section 621a gradually expands toward the side molding section. Further, at the center area of the side molding section (refer to FIG. 24), the largest level difference is produced and the sandwiched thickness of the auxiliary molding 63 and the separation of the glass-side decorative section 621a reach the maximum values. Such maximum separation of the glass-side decorative section 621a is maintained even toward the lower end of the side molding section. In the space produced by separation of the glass-side decorative section 621a from the windshield glass surface, a rainwater retaining groove 628 is formed facing inwards.

When the glass-side decorative section 621a separates from the surface of windshield glass 1, the positioning of the molding may be thought to become unstable and the molding may be thought to cause deformation. However, since the side molding sections 62C are made of a more rigid material P1, the position and shape of the windshield molding 62 can, in fact, be maintained stably along the corner sections and all the way around.

Since the facility to mold the above windshield molding 62 has the same structure as those already described and as the extrusion molding process is also executed in a similar way, explanations shall not be repeated here.

What is claimed is:

1. A windshield molding for a vehicle installed with windshield glass, comprising:
    an auxiliary molding;
    a plurality of interconnected sections which upon being installed in the vehicle are of a substantially rectilinear shape; and
    a plurality of bending sections, said interconnected sections and bending sections being connected to said auxiliary molding and including a decorative portion exposed externally and a support leg projecting from said decorative portion to be inserted and fixed to the vehicle body, wherein said decorative portion and support leg include a continuously and integrally extrusion molded body, at least the external surface of said decorative portion is made of a single type of material throughout the entire length thereof including the interconnected sections and bending sections, and wherein the support legs and said auxiliary molding corresponding to bending sections are more flexible than the interconnected sections.

* * * * *

UNITED STATES PATENT AND TRADEMARK OFFICE
CERTIFICATE OF CORRECTION

PATENT NO. : 5,443,299
DATED : August 22, 1995
INVENTOR(S) : Yukihiko YADA, et al.

It is certified that error appears in the above-indentified patent and that said Letters Patent is hereby corrected as shown below:

On the title page, Item [*], the Terminal Disclaimer Date should read:

--Sep. 27, 2011--

Signed and Sealed this

Twelfth Day of December, 1995

Attest:

BRUCE LEHMAN

*Attesting Officer*  *Commissioner of Patents and Trademarks*